Aug. 19, 1958

B. BIDERMAN 2,848,160

TRIGONOMETRIC COMPUTING APPARATUS

Filed Aug. 28, 1952

INVENTOR.
*BEN BIDERMAN*
BY
*Marvin Moody*
ATTORNEY

United States Patent Office 2,848,160
Patented Aug. 19, 1958

2,848,160

TRIGONOMETRIC COMPUTING APPARATUS

Ben Biderman, Cedar Rapids, Iowa, assignor to Collins Radio Company, Cedar Rapids, Iowa, a corporation of Iowa Application August 28, 1952, Serial No. 306,778

5 Claims. (Cl. 235—61)

This invention relates in general to resolving means and in particular to a novel computer which substantially eliminates errors in distance measuring equipment caused by harmonic content and frequency variations in the power supply.

It is oftentimes desirable in the electronics field to connect a plurality of resolvers such that an output signal may be obtained which bears a particular relationship to the input signal. Stated differently, in trigonometric resolving apparatus, it is oftentimes desirable to solve for the distance and bearing between two points. For example, in airplanes at times a pilot has to find his distance and bearing to a destination which has no distance measuring facilities. This may be done by utilizing the radio facilities of a third location.

It is an object of this invention, therefore, to provide a resolving means wherein distance may be computed very accurately so as to eliminate errors caused by harmonic content and frequency variations.

Further objects, features and advantages of this invention will become apparent from the following description and claims when read in view of the drawings, in which:

Figure 1:
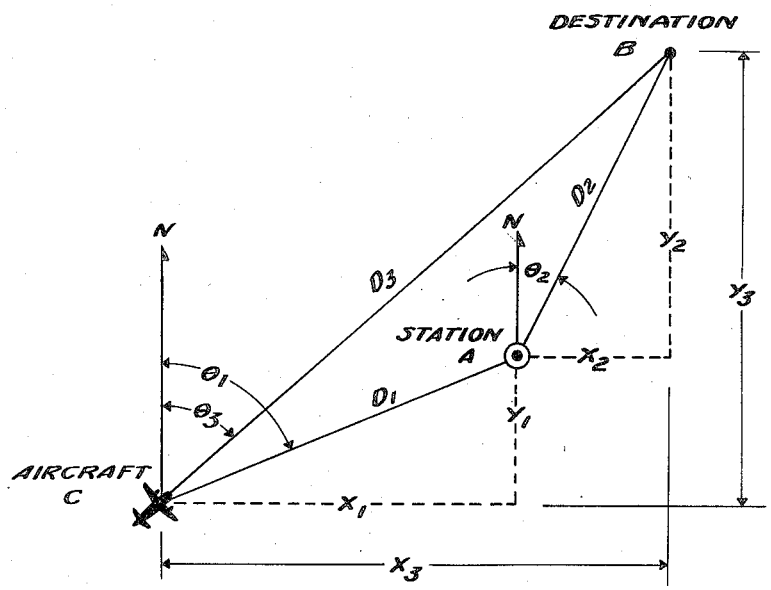
Figure 1 illustrates a problem which can be solved with equipment built according to the principle of this invention.

Figure 1 illustrates a radio station A which is located at the origin of a Cartesian plotting system. Point B is the desired destination of an aircraft C. Coordinates of the aircraft relative to the station are indicated by $x_1$ and $y_1$, whereas the coordinates of the destination B relative to the station A are indicated by $x_2$ and $y_2$.

The distance from the point B to the station is designated as $D_2$, the distance from the aircraft to the station as $D_1$, and the distance from the aircraft to B is designated as $D_3$.

The bearing of the destination from the station is designated as $\theta_2$. The bearing of the station to the aircraft is designated as $\theta_1$, and the bearing of the destination from the aircraft as $\theta_3$. The distance $D_2$ and bearing $\theta_2$ are known because they may be measured directly from a map.

It is assumed that the angle $\theta_1$ and the distance $D_1$ are known, perhaps from distance measuring equipment carried on the aircraft and a radio compass. It is desired to solve for the angle $\theta_3$ and the distance $D_3$ so that the pilot may know his bearing and distance to the destination. It is to be realized, of course, that such problems arise when the destination has no radio facilities available for use for the aircraft's conventional direction finding and distance measuring equipment.

Figure 2:
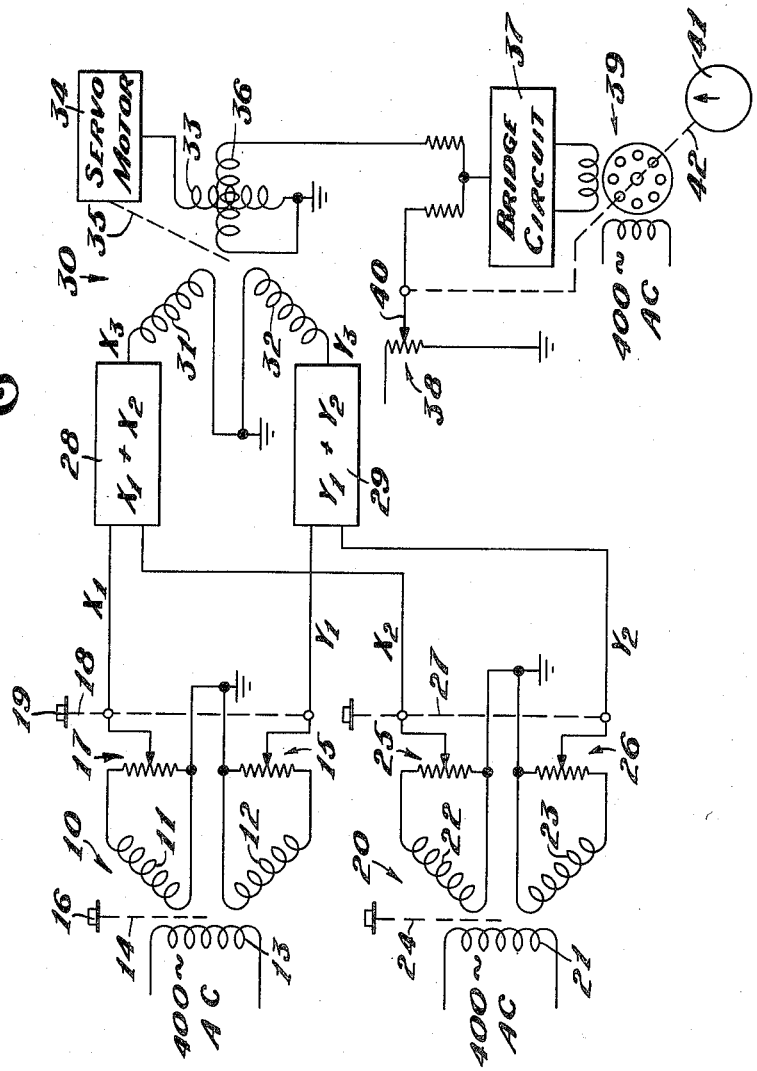
Figure 2 illustrates a conventional manner for solving for an unknown angle and distance.

Figure 2 illustrates the conventional manner for solving this problem, wherein a first resolver 10 has a pair of windings 11 and 12 mounted at right angles to each other and an input winding 13 to which an alternating power supply is connected, as for example, 400 cycles, 26 volts alternating current.

The resolver 10 is of a type well known to those skilled in the art and the winding 13 may be either the rotor or stator. A shaft 14 is connected to the rotor of the resolver and is manually set by the knob 16 to the angle $\theta_1$. It is to be realized, of course, that a suitable servo mechanism may be connected to the shaft 14 to position it automatically.

A pair of potentiometers 17 and 15 are connected across the windings 11 and 12 and a shaft 18 is connected to them. A knob 19 is mounted on shaft 18 for varying their positions to set in $D_1$. This distance may be supplied manually or automatically as desired. The outputs of the resolver 10 will be equal to $x_1$ and $y_1$, respectively.

A second resolver 20 has a first winding 21 which receives a suitable power supply input, as for example, 400 cycles, 26 volts A. C. and a pair of windings 22 and 23 which are mounted at right angles to each other. A shaft 24 is connected to the rotor of the resolver 20 and is manually set to the angle $\theta_2$. A pair of potentiometers 25 and 26 are connected across the windings 22 and 23 and are driven by a shaft 27 which is manually adjusted to the distance $D_2$. The output of the resolver 20 will be $x_2$ and $y_2$. The outputs $x_1$ and $y_1$, $x_2$ and $y_2$ from resolvers 10 and 20 will have a phase relationship which depends on the relative positions of the aircraft, the radio station and the destination. For example, if the $x$ coordinates are in opposite directions from the radio station to the aircraft and destination, respectively, the $x_1$ and $x_2$ will be in phase and will add in magnitude. If, on the other hand, the aircraft and destination are on one side of the radio station $x_1$ and $x_2$ will be out of phase. When added, the difference in their magnitude will be obtained. The same thing is true with regard to $y_1$ and $y_2$. Thus, the resolvers 10 and 20 automatically consider the orientation of the station, aircraft and destination and produce outputs which are either in phase or out of phase.

A pair of summing amplifiers 28 and 29 receive the outputs of the resolvers 10 and 20, and produce signals proportional to $x_3$ and $y_3$, the desired coordinates of the destination.

A third resolver 30 comprises four windings, two on the rotor and two on the stator. The stator windings 31 and 32 are at right angles to each other and receive the $x_3$ and $y_3$ inputs. One of the output windings 33 is connected to a servo motor 34 which is in turn connected to a shaft 35 that drives the rotor of the resolver 30. The servo 34 runs until the winding 33 and no output and the shaft 35 will then be positioned to the angle $\theta_3$.

The other winding 36 of the rotor will then have a voltage developed across it which is proportional to the distance $D_3$.

The output of winding 36 is fed to a bridge circuit 37 where it is compared with a voltage across a precision potentiometer 38. A servo motor 39 receives the output from the bridge circuit 37 and drives a slide contact 40 on the precision potentiometer 38 until the voltage across the potentiometer is balanced with the output of the winding 36. A dial 41 is connected to the shaft 42 of the servo motor 39 to indicate the distance $D_3$.

This method has one serious drawback and that is that it is highly frequency sensitive and when a number of harmonics are present in the output of the winding 36, the bridge circuit will become unbalanced even though the potentiometer is at the correct setting, and thus an erroneous answer will be obtained. Under certain circumstances the motor 39 will continually hunt and never reaches a satisfactory position.

Figure 3:
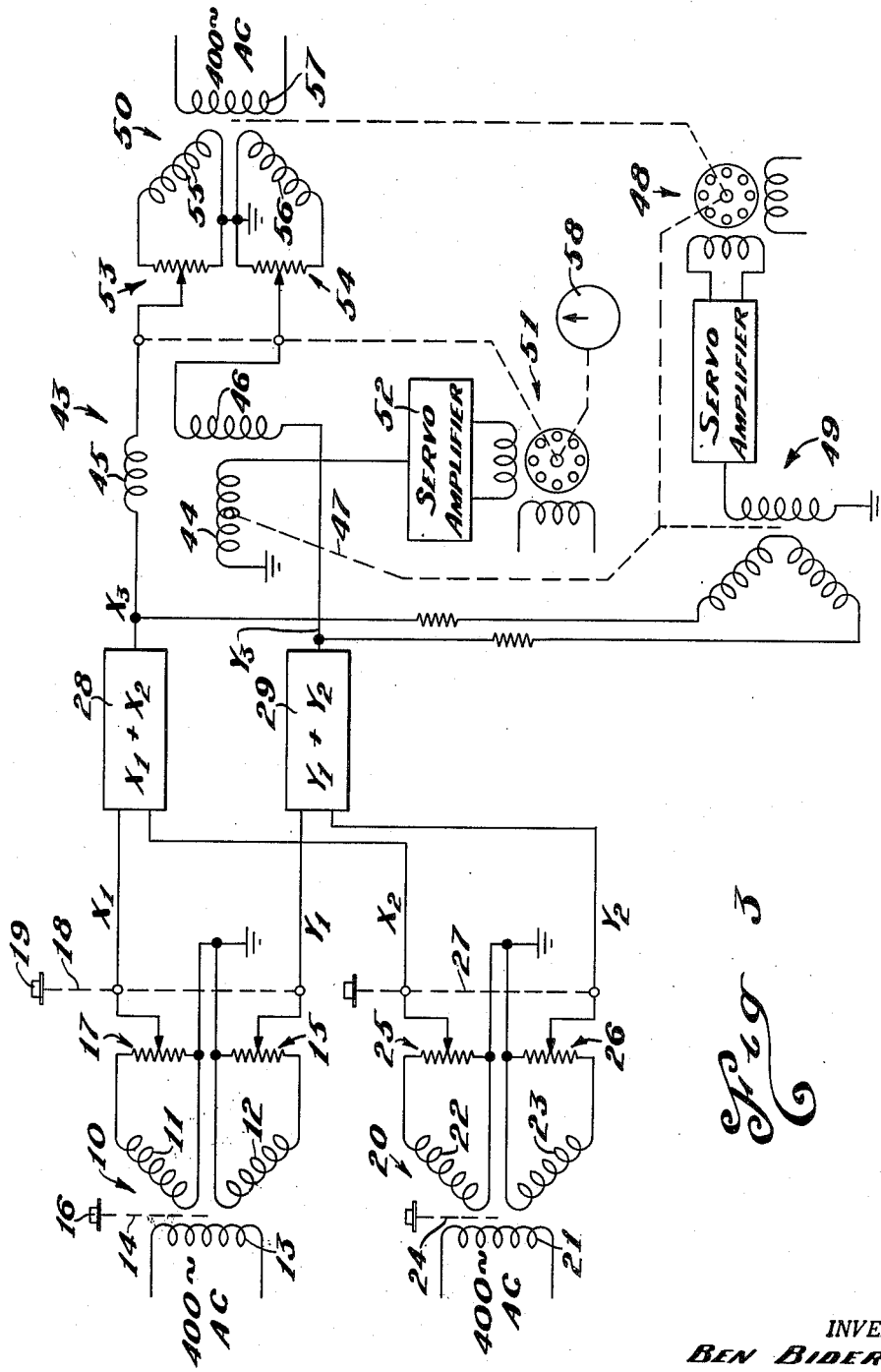
Figure 3 is a schematic illustration of the structure according to the principles of my invention.

To abrogate this difficulty, applicant has developed the apparatus shown in Figure 3. The resolvers 10 and 20 and summing amplifiers 28 and 29 are the same as in Figure 2.

Outputs from summing amplifiers 28 and 29 are applied to the stator windings of resolver 49 and are voltages proportional respectively to $X_3$ and $Y_3$. The voltage induced in the rotor winding of resolver 49 is, therefore, due to resolver transfer characteristics, proportional to $X_3 \cos \alpha - X_3 \sin \alpha$ where $\alpha$ is the angular position of the rotor of resolver 49. Now, referring to Figure 1, the distances $X_3$ and $Y_3$ may be expressed as $D_3 \sin \theta_3$ and $D_3 \cos \theta_3$ respectively. Thus the voltages on the rotor of resolver 49 may by substitution of the expressions for $X_3$ and $Y_3$ be considered proportional to:

$$D_3(\sin \theta_3 \cos \alpha - \cos \theta_3 \sin \alpha)$$

This voltage is applied as input to a servo amplifier which drives servo motor 48 which in turn positions the rotor of resolver 49 for a null at which the rotor voltage is zero. Therefore, equaling the above expression for this rotor voltage to zero, one may write:

$$\sin \theta_3 \cos \alpha - \cos \theta_3 \sin \alpha = 0$$

or $$\sin \theta_3 \cos \alpha = \cos \theta_3 \sin \alpha$$

The last expression is satisfied when the rotor position angle $\alpha$ equals the destination bearing $\theta_3$. Thus, the position of the rotor of resolver 49 corresponds to destination bearing $\theta_3$ and an indicator might be driven from this rotor shaft to continuously indicate the destination bearing angle $\theta_3$.

With further reference to Figure 3, it is noted that the rotor of resolver 49 is mechanically coupled to the rotor 57 of resolver 50 and the rotor 44 of resolver 43. Voltages from summing amplifiers 28 and 29 proportional respectively to destination coordinates $X_3$ and $Y_3$ are also applied to one side of stator windings 45 and 46 of resolver 43. A supply signal of, for example, 400 v. A. C. is applied to rotor winding 57 of resolver 50, which rotor, as previously discussed, is continuously positioned to the aircraft to destination bearing $\theta_3$. The voltages induced in stator windings 55 and 56 may be then expressed in terms of the supply signal (V) as being respectively proportional to $V \sin \theta_3$ and $V \cos \theta_3$.

Figure 1 shows $\sin \theta_3$ and $\cos \theta_3$ to be equal to $$\frac{X_3}{D_3} \text{ and } \frac{Y_3}{D_3}$$

respectively. Thus at any instant, the voltages on stator windings 55 and 56 of resolver 50 may be expressed as $$\frac{V}{D_3}(X_3)$$

and $$\frac{V}{D_3}(Y_3)$$

respectively and are seen to each be proportional to aircraft to destination distance, $D_3$. These voltages are applied through potentiometers 53 and 54 to the remaining ends of stator windings 45 and 46 of resolver 43. If these voltages are made equal in phase and amplitude to the $X_3$ and $Y_3$ voltages applied to the other end of the stator windings from the summing amplifiers 28 and 29, there is effectively zero voltage developed across the stator windings, and consequently, no voltage can be developed in the rotor 44 of resolver 43. This condition is continuously attained by rotation of potentiometers 53 and 54, which vary the output of stator windings 55 and 56 of resolver 50. Any voltage induced in rotor 44 as a result of mis-correspondence in the signals applied to the ends of the stator windings is applied to servo amplifier 52 from rotor 44 which is positioned to the aircraft to destination bearing $\theta_3$. Resolver 43 then acts as two mixing transformers, the outputs of which are continuously applied in proper phase to servo amplifier 52 which serves to position the potentiometers 53 and 54 to provide a null in this servo loop. The shaft position of servo motor 51 and wiper contact positions of potentiometers 53 and 54 thus is indicative of aircraft to destination distance $D_3$ since the potentiometer wiper arm positions are a direct function of the distance D. Rotor 44 of resolver 43 is positioned in accordance with the destination bearing $\theta_3$ to introduce the necessary phase characteristics of the servo signals peculiar to conditions of decreasing and increasing distance. This phasing situation becomes apparent upon considering that the inputs to the ends of each of the stator windings 45 and 46 must be of the same phase such that magnitude adjustment by potentiometers 53 and 54 will result in voltages of equal phase and magnitude being applied to the opposite ends of each stator winding to realize a net voltage application of zero in each winding when the potentiometer wiper arms are positioned in accordance with distance $D_3$. The scheme for developing a shaft position indicative of distance $D_3$ is thus seen to entail the development of synthetic $X_3$ and $Y_3$ coordinates maintained equal in phase and amplitude by the servo loop to the $X_3$ and $Y_3$ coordinates obtained from summing amplifiers 28 and 29 respectively. Since $X_3$ and $Y_3$ are proportional to $D_3$, it follows that the wiper arms of potentiometers 53 and 54 are positioned in proportion to $D_3$.

It is to be noted that the reference signal with which the output of the summing amplifiers 28 and 29 are compared, is obtained from the potentiometer resolver 59 which receives an input from the same power supply that supplies power to the resolvers 10 and 20. Since the resolver 50 is similar to the resolvers 10 and 20, the harmonic content will act in the same fashion on both paths.

It is seen that this invention provides an improved resolver computation system which removes inaccuracies that are obtained in the conventional bridge type computer.

Although this invention has been described with respect to particular embodiments thereof, it is not to be so limited as changes and modifications may be made therein which are within the full intended scope of the invention, as defined by the appended claims.

I claim:

1. A computing apparatus comprising five resolvers, an alternating current voltage source connected to a winding on three of said resolvers, each of said resolvers comprising three windings which form the stator and rotor, a control shaft connected to the rotor of the first resolver, a second control shaft connected to the rotor of the second resolver, a first pair of potentiometers connected across two of the windings of said first resolver, a second pair of potentiometers connected across two of the windings of the second resolver, a first summing amplifier receiving inputs from the first potentiometer of the first and second pair of potentiometers, a second summing amplifier receiving inputs from the second potentiometer of the first and second pair of potentiometers, a pair of windings of the fourth resolver receiving inputs from the first and second summing amplifiers, a pair of windings of said fifth resolver receiving inputs from said first and second summing amplifiers, a first servo motor connected to the rotor of the third, fourth and fifth resolvers, a first servo amplifier connected to one of the windings of the fifth resolver and supplying an input to the first servo motor, a third pair of potentiometers connected across two of the windings of the third resolver, outputs from said third pair of potentiometers connected to the pair of windings of the fourth resolver, a second servo amplifier connected to the third winding of the fourth resolver, and a second servo motor receiving an input from said second servo amplifier and connected to the third pair of potentiometers to vary their positions.

2. A computing apparatus comprising five resolvers, first, second and third windings mounted on each resolver and forming rotor and stator windings, a power supply connected to a first winding of the first, second and third resolvers, a first pair of potentiometers connected across the second and third windings of the first resolver, a second pair of potentiometers connected across the second and third windings of the second resolver, a first summing amplifier receiving the input of the first potentiometers of the first and second pairs, a second summing amplifier receiving inputs from the second potentiometers of the first and second pairs, the first and second windings of the fourth and fifth resolvers connected, respectively, to the outputs of the first and second summing amplifiers, a first servo motor connected to drive the rotors of the third, fourth and fifth resolvers, a first servo amplifier connected to the third winding of said fifth resolver and supplying an input to said first servo motor, a second servo amplifier connected to the third winding of the fourth resolver, a second servo motor receiving an input from said second servo amplifier, a third pair of potentiometers connected across the second and third windings of the third resolver, a control shaft of said second servo motor connected to said third pair of potentiometers, and the first and second windings of the fourth resolver connected, respectively, to the third pair of potentiometers.

3. A computing apparatus comprising, five resolvers, a first control shaft connected to the first resolver, a second control shaft connected to the second resolver, a first pair of potentiometers connected across the first resolver, a third control shaft connected to said first pair of potentiometers, a second pair of potentiometers connected across the second resolver, a fourth control shaft connected to said second pair of potentiometers, a pair of summing amplifiers with the first one receiving inputs from the first potentiometers of the first and second pairs and the second one receiving inputs from the second potentiometers of the first and second pairs, a third resolver receiving inputs from said summing amplifiers, a third pair of potentiometers connected across the fourth resolver and supply inputs to the third resolver, the fifth resolver connected to the summing amplifiers, a first servo motor with its output shaft connected to the rotors of the third, fourth and fifth resolvers, a first servo amplifier connected to the fifth resolver and supplying an input to said first servo motor to drive it until the rotor of the fifth resolver is positioned to a null, a second servo amplifier connected to the third resolver, a second servo motor receiving an input from the second servo amplifier and with its output shaft connected to the third pair of potentiometers, and an indicating means connected to said second servo motor.

4. A computing apparatus comprising five resolvers, with the first, second and third resolvers receiving an alternating current input from the same power supply, control means for the first resolver for adjusting the angle of its rotor and the amplitude of its output, the second resolver having control means for adjusting the angular position of its rotor and the amplitude of its output, a pair of summing amplifiers each receiving an input from the first two resolvers, the fourth and fifth resolvers receiving the outputs of the summing amplifiers, a first servo amplifier receiving an output from the fifth resolver, a first servo motor receiving an input from the first servo amplifier and furnishing a shaft output to the third, fourth and fifth resolvers, a second servo amplifier connected to the fourth resolver, a second servo motor receiving an input from the second servo amplifier, amplitude controlling means connected to the third and fourth resolvers, and said amplitude controlling means connected to the output shaft of said second servo motor.

5. Apparatus according to claim 4 wherein the first servo motor positions the rotor of the fifth resolver so that the rotor of the fifth resolver goes to a null and an indicating means is connected to the second servo motor for indicating an amplitude of the setting of the amplitude control means of the third resolver.

References Cited in the file of this patent

UNITED STATES PATENTS 2,510,384  Dehmel _____ June 6, 1950
2,560,528  Dehmel _____ July 10, 1951

OTHER REFERENCES

"Electronic Instruments"; Greenwood, Jr., Holdam and MacRae; McGraw-Hill, 1948; pages 477–480 relied upon.